(12) United States Patent
Horikawa et al.

(10) Patent No.: US 11,108,042 B2
(45) Date of Patent: Aug. 31, 2021

(54) POSITIVE ELECTRODE COMPOSITE MATERIAL FOR LITHIUM ION SECONDARY BATTERY AND USE THEREOF

(71) Applicants: TOYOTA JIDOSHA KABUSHIKI KAISHA, Toyota (JP); SUMITOMO METAL MINING CO., LTD., Tokyo (JP); Daisuke Horikawa, Toyota (JP); Ryuta Sugiura, Toyohashi (JP); Taira Aida, Niihama (JP); Satoshi Kanada, Niihama (JP)

(72) Inventors: Daisuke Horikawa, Toyota (JP); Ryuta Sugiura, Toyohashi (JP); Taira Aida, Niihama (JP); Satoshi Kanada, Niihama (JP)

(73) Assignees: TOYOTA JIDOSHA KABUSHIKI KAISHA, Toyota (JP); SUMITOMO METAL MINING CO., LTD., Tokyo (JP)

( * ) Notice: Subject to any disclaimer, the term of this patent is extended or adjusted under 35 U.S.C. 154(b) by 29 days.

(21) Appl. No.: 16/484,697

(22) PCT Filed: Feb. 8, 2018

(86) PCT No.: PCT/JP2018/004450
§ 371 (c)(1),
(2) Date: Aug. 8, 2019

(87) PCT Pub. No.: WO2018/147382
PCT Pub. Date: Aug. 16, 2018

(65) Prior Publication Data
US 2020/0058936 A1 Feb. 20, 2020

(30) Foreign Application Priority Data
Feb. 9, 2017 (JP) .............................. JP2017-022417

(51) Int. Cl.
*H01M 4/525* (2010.01)
*H01M 4/505* (2010.01)
*H01M 4/02* (2006.01)

(52) U.S. Cl.
CPC .......... *H01M 4/525* (2013.01); *H01M 4/505* (2013.01); *H01M 2004/027* (2013.01); *H01M 2004/028* (2013.01)

(58) Field of Classification Search
None
See application file for complete search history.

(56) References Cited

U.S. PATENT DOCUMENTS

2009/0075165 A1    3/2009   Park et al.
2010/0117033 A1*   5/2010   Guo ..................... H01G 11/24
                                              252/507
(Continued)

FOREIGN PATENT DOCUMENTS

CN    106450270 A    2/2017
EP     2403041 A1    1/2012
(Continued)

OTHER PUBLICATIONS

International Search Report for PCT/JP2018/004450 dated May 15, 2018 [PCT/ISA/210].

*Primary Examiner* — Amanda J Barrow
(74) *Attorney, Agent, or Firm* — Sughrue Mion, PLLC

(57) ABSTRACT

A positive electrode composite material for a lithium ion secondary battery that makes it possible to appropriately reduce the electric resistance in a positive electrode and to realize a high-performance lithium ion secondary battery. The positive electrode composite material to be used in the positive electrode of the lithium ion secondary battery includes a particulate positive electrode active material composed of a lithium composite oxide having a layered crystal structure including at least lithium, and a conductive (Continued)

oxide. Here, a particulate region where primary particles of the conductive oxide are aggregated, and a film-shaped region where the conductive oxide is formed in a film shape adhere to at least a part of the surface of the positive electrode active material. The average particle diameter based on cross-sectional TEM observation of primary particles in the particulate region is equal to or greater than 0.3 nm, and in cross-sectional TEM observation of the film-shaped region, no particles with a particle diameter equal to or greater than 0.3 nm are observed, and there are no voids equal to or greater than 2 nm.

8 Claims, 2 Drawing Sheets

(56) References Cited

U.S. PATENT DOCUMENTS

| | | |
|---|---|---|
| 2010/0151331 A1 | 6/2010 | Sun et al. |
| 2011/0052991 A1 | 3/2011 | Kim et al. |
| 2014/0087256 A1 | 3/2014 | Li et al. |
| 2014/0162132 A1 | 6/2014 | Ishii et al. |
| 2016/0013472 A1 | 1/2016 | Mitsumoto et al. |
| 2016/0351943 A1* | 12/2016 | Albano ............... H01M 10/056 |
| 2016/0351973 A1* | 12/2016 | Albano ................... H01M 4/13 |
| 2018/0248179 A1 | 8/2018 | Wang et al. |

FOREIGN PATENT DOCUMENTS

| | | |
|---|---|---|
| EP | 2 590 246 A1 | 5/2013 |
| JP | 2000-235858 A | 8/2000 |
| JP | 2001-266879 A | 9/2001 |
| JP | 2009-76446 A | 4/2009 |
| JP | 2014-116111 A | 6/2014 |
| JP | 2014-143032 A | 8/2014 |
| JP | 2015-093907 A | 5/2015 |
| JP | 2016-41653 A | 3/2016 |

* cited by examiner

US 11,108,042 B2

POSITIVE ELECTRODE COMPOSITE MATERIAL FOR LITHIUM ION SECONDARY BATTERY AND USE THEREOF

CROSS REFERENCE TO RELATED APPLICATIONS

This application is a National Stage of International Application No. PCT/JP2018/004450 filed Feb. 8, 2018, claiming priority based on Japanese Patent Application No. 2017-022417 filed on Feb. 9, 2017, the entire contents of that application being incorporated herein by reference.

TECHNICAL FIELD

The present invention relates to a positive electrode composite material for a lithium ion secondary battery that is suitable for a positive electrode of a lithium ion secondary battery, and to a lithium ion secondary battery using the positive electrode composite material.

BACKGROUND ART

In recent years, secondary batteries such as lithium ion secondary batteries and nickel hydrogen batteries have been advantageously used as so-called portable power sources for personal computers and portable terminals and also as power sources for driving vehicles. In particular, lithium ion secondary batteries, which are light in weight and capable of obtaining high energy density, are becoming increasingly important as high-power power sources to be mounted on vehicles such as electric vehicles and hybrid vehicles.

Such a lithium ion secondary battery uses, for example, a positive electrode in which a positive electrode composite material layer is provided on the surface of a positive electrode current collector that is a conductive foil. The positive electrode composite material layer includes a positive electrode active material composed of a lithium composite oxide that occludes and releases lithium ions. The positive electrode composite material layer is formed of a paste-like positive electrode composite material for a lithium ion secondary battery (hereinafter, also simply referred to as "positive electrode composite material") in which a positive electrode active material and other additives are dispersed in a dispersion medium.

The additive to be added to this positive electrode composite material can be exemplified by a conductive oxide. By adding the conductive oxide, an electron path can be formed with the positive electrode active material to reduce the electrical resistance in the positive electrode. For example, Patent Literature 1 discloses a cathode (positive electrode) in which a cathode active material composition (positive electrode composite material layer) is coated with vanadium oxide (conductive oxide). Further, Patent Literature 2 discloses a technique of adding an oxide represented by the general formula: $ABO_3$, $A_2BO_4$, $MO_2$ or a mixture of such oxides to a positive electrode. In addition, Patent Literature 3 discloses a non-aqueous electrolyte secondary battery in which the surface of the active material particles contained in the positive electrode is coated with an oxide represented by the general formula: $ABO_3$ or $A_2BO_4$.

CITATION LIST

Patent Literature

Patent Literature 1: Japanese Patent Application Publication No. 2009-76446
Patent Literature 2: Japanese Patent Application Publication No. 2000-235858
Patent Literature 3: Japanese Patent Application Publication No. 2001-266879

SUMMARY OF INVENTION

Technical Problem

However, it cannot be said that the techniques described in Patent Literatures 1 to 3 described above can sufficiently reduce the electrical resistance in the positive electrode, and further improvement has been desired.

For example, as a result of examining the technique described in Patent Literature 1, the inventors of the present invention have found that with such a technique, the surface of the positive electrode composite material layer is coated with particulate vanadium oxide having low density low density, and a sufficient electron path cannot be formed because of point contact between the vanadium oxide and the positive electrode active material.

Further, in the technique described in Patent Literature 2, a particulate conductive oxide is dispersed in the positive electrode composite material layer, and a point contact is realized between the particulate positive electrode active material and the conductive oxide in the same manner as in the above-described Patent Literature 1.

Meanwhile, in the technique described in Patent Literature 3, since a thin film of conductive oxide is formed on the surface of the particulate positive electrode active material, a wider electron path can be formed as compared with the technique using a particulate conductive oxide as in Patent Literature 1 or Patent Literature 2. However, the research conducted by the inventors of the present invention has demonstrated that with the technique of Patent Literature 3, a new problem arises. Thus, since the abovementioned conductive oxide and positive electrode active material are sintered to form a composite, the area of the contact portion between the positive electrode active material and the electrolyte is significantly reduced and the reaction resistance is increased.

The present invention has been completed with the foregoing in view, and the main object thereof is to provide a positive electrode composite material for a lithium ion secondary battery that makes it possible to reduce appropriately the electrical resistance in a positive electrode and to realize a high-performance lithium ion secondary battery.

Solution to Problem

In order to achieve the above object, the present invention provides a positive electrode composite material for a lithium ion secondary battery having the following configuration.

The positive electrode composite material for a lithium ion secondary battery disclosed herein is a positive electrode composite material to be used for a positive electrode of a lithium ion secondary battery, the positive electrode composite material including a particulate positive electrode active material composed of a lithium composite oxide having a layered crystal structure including at least lithium, and a conductive oxide.

Here, in such a positive electrode composite material for a lithium ion secondary battery, a particulate region where primary particles of the conductive oxide are aggregated, and a film-shaped region where the conductive oxide is formed in a film shape adhere to at least a part of the surface of the positive electrode active material, an average particle diameter based on cross-sectional TEM observation of primary particles in the particulate region is equal to or greater than 0.3 nm, and in cross-sectional TEM observation of the film-shaped region, no particles with a particle diameter equal to or greater than 0.3 nm are observed, and no voids equal to or greater than 2 nm are observed.

In the positive electrode composite material disclosed herein, the particulate region where primary particles of the conductive oxide are aggregated, and the film-shaped region where the conductive oxide is formed in a film shape adhere to at least a part of the surface of the positive electrode active material.

In such a positive electrode composite material, the film-shaped region composed of the conductive oxide adheres to the positive electrode active material in a very dense state in which particles equal to or greater than 0.3 nm and voids equal to or greater than 2 nm are not recognized. Therefore, surface contact with the surface of the positive electrode active material can form a wide electron path, and the resistance in the positive electrode can be greatly reduced.

Meanwhile, the particulate region of the positive electrode composite material is formed by the aggregation of relatively large primary particles having an average particle diameter equal to or greater than 0.3 nm. As a result, the primary particles and the positive electrode active material come into point contact with each other at a location where the particulate region on the surface of the positive electrode active material adheres, and thus an electron path is formed at the contact point, the surface of the positive electrode active material is exposed in portions other than the contact point, and sufficient area of contact between the positive electrode active material and the electrolyte can be ensured. For this reason, an increase in reaction resistance due to a decrease in the contact area between the positive electrode active material and the electrolyte can be suppressed.

As described above, with the positive electrode composite material disclosed herein, a wide electron path can be formed at a location where the particulate region on the surface of the positive electrode active material adheres, thereby significantly reducing the resistance in the positive electrode. In addition, since a sufficient contact area between the positive electrode active material and the electrolyte can be ensured at the location where the particulate region adheres and the increase in reaction resistance can be suppressed, the battery performance can be significantly improved as compared to the conventional positive electrode composite material.

Further, in a preferred embodiment of the positive electrode composite material disclosed herein, the conductive oxide is a metal oxide represented by a general formula (1):

$$MO_2 \quad (1)$$

(where, M in the formula (1) above is one or two or more elements selected from transition metal elements of groups Va, VIa, VIIa, VIII, and Ib), or a metal oxide having a perovskite structure and represented by a general formula (2):

$$ABO_3 \quad (2)$$

(where, A in the formula (2) above is one or two or more elements selected from the group consisting of divalent typical elements, lanthanoid elements, and a combination thereof, and B is one or two or more elements selected from transition metal elements of groups IVa, Va, VIa, VIIa, VIII, and Ib).

The metal oxide represented by $MO_2$ in the general formula (1) above and the metal oxide $ABO_3$ having a perovskite structure and represented by the general formula (2) above form a suitable electron path with the positive electrode active material. Therefore, the resistance in the positive electrode can be reduced more appropriately to improve the battery performance more suitably.

Further, in another preferable embodiment of the positive electrode composite material disclosed herein, the conductive oxide is ruthenium oxide or a lanthanum manganese cobalt composite oxide.

Among the metal oxides represented by the general formula (1) or the general formula (2) above, the ruthenium oxide and lanthanum manganese cobalt composite oxide can reduce the resistance in the positive electrode particularly suitably. Therefore, the performance of the constructed lithium ion secondary battery can be improved more suitably.

In yet another preferable embodiment of the positive electrode composite material disclosed herein, the positive electrode active material is a lithium composite oxide represented by a general formula (3):

$$Li_{1+\alpha}Ni_xCo_yMn_zM_\beta O_{2-\gamma}A_\gamma \quad (3)$$

(where, M in the formula (3) above is one or two or more elements selected from the group consisting of Zr, Mo, W, Mg, Ca, Na, Fe, Cr, Zn, Si, Sn, Al, and B; A in the formula (3) is one or two or more elements selected from the group consisting of F, Cl, and Br; and x, y, z, $\alpha$, $\beta$, and $\gamma$ is $0 \le \alpha \le 0.7$, $0 \le x < 0.9$, $0 \le y < 0.4$, $x+y+z \approx 1$, $0 \le \beta \le 0.1$, $0 \le \gamma \le 0.5$, respectively).

The lithium composite oxide as represented by the general formula (3) has high ion conductivity, and therefore can contribute to the construction of a high-energy-density battery, and also excels in thermal stability, and therefore can contribute to the improvement of battery durability.

Further, in another preferable embodiment of the positive electrode composite material disclosed herein, a coverage based on cross-sectional TEM observation of the conductive oxide on the surface of the positive electrode active material is 11% to 40%.

Where the coverage of the conductive oxide is too high, the contact area between the positive electrode active material and the electrolyte may be reduced, whereas when the coverage is too low, a sufficient electron path cannot be formed. In the present embodiment, with the aforementioned findings in view, the coverage based on cross-sectional TEM observation of the conductive oxide on the surface of the positive electrode active material is set to 11% to 40%, thereby ensuring sufficient contact area between the positive electrode active material and the electrolyte and forming a sufficient electron path. Therefore, the battery performance can be more appropriately improved.

In another preferable embodiment of the positive electrode composite material disclosed herein, an average particle diameter based on cross-sectional TEM observation of the particulate region is 0.6 nm to 55 nm, and a film thickness based on cross-sectional TEM observation of the film-shaped region is 0.5 nm to 50 nm.

As a result of various experiments and studies conducted by the inventors of the present invention, it has been found that in the positive electrode composite material disclosed herein, the average particle diameter of the particulate region and the film thickness of the film-shaped region exert significant influence on the battery performance (normalized battery resistance) of a lithium ion secondary battery. Additional experiments have demonstrated that by setting the average particle diameter of the particulate region to 0.6 nm to 55 nm and setting the film thickness of the film-shaped region to 0.5 nm to 50 nm, it is possible to construct a high-performance lithium ion secondary battery having a low normalized battery resistance. This embodiment is based on such findings.

Moreover, in another preferable embodiment of the positive electrode composite material disclosed herein, at least parts of the particulate region and the film-shaped region are in contact with each other.

By so bringing the particulate region and the film-shaped region into contact with each other, a sufficient electron path can be formed at the contact portion, and the contact area between the positive electrode active material and the electrolyte can be appropriately ensured. Therefore, the battery performance can be improved more suitably.

According to another aspect of the present invention, there is provided a lithium ion secondary battery in which a positive electrode composite material layer is produced using the above-described positive electrode composite material. Specifically, the lithium ion secondary battery includes: a positive electrode having a positive electrode composite material layer applied to a positive electrode current collector, a negative electrode having a negative electrode composite material layer applied to a negative electrode current collector, and a non-aqueous electrolyte, wherein the positive electrode composite material layer includes a particulate positive electrode active material composed of a lithium composite oxide having a layered crystal structure including at least lithium, and a conductive oxide.

Further, in the lithium ion secondary battery disclosed herein, a particulate region where primary particles of the conductive oxide are aggregated, and a film-shaped region where the conductive oxide is formed in a film shape adhere to at least a part of the surface of the positive electrode active material, an average particle diameter based on cross-sectional TEM observation of primary particles in the particulate region is equal to or greater than 0.3 nm, and in cross-sectional TEM observation of the film-shaped region, no particles with a particle diameter equal to or greater than 0.3 nm are observed, and there are no voids equal to or greater than 2 nm.

In the lithium ion secondary battery disclosed herein, the positive electrode composite material layer is formed using the positive electrode composite material in which the particulate region and the film-shaped region composed of a conductive oxide adhered to a part of the surface of the positive electrode active material. For this reason, the resistance in the positive electrode is appropriately reduced, and the increase in reaction resistance in the positive electrode is suppressed. As a result, battery performance superior to that of the related art can be exhibited.

DESCRIPTION OF EMBODIMENTS

Figure 1:
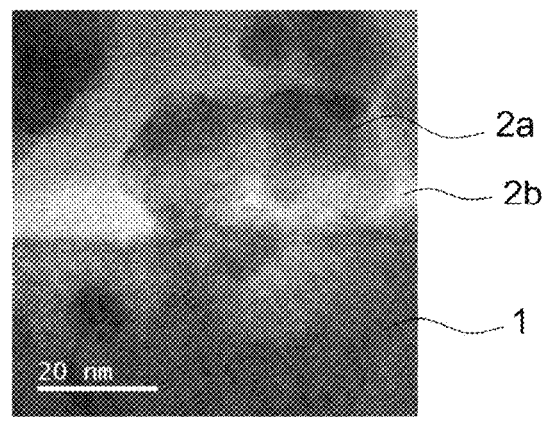
FIG. 1 is a cross-sectional TEM image of a positive electrode composite according to an embodiment of the present invention.

Hereinafter, an embodiment of the present invention will be described with reference to the drawings. In the following drawings, the same reference numerals are given to members and portions that exhibit the same action. Also, the dimensional relationships (length, width, thickness, etc.) in the drawings do not reflect the actual dimensional relationships. In addition, matters other than those specifically mentioned in the present description and necessary for implementing the present invention (for example, configuration and manufacturing method of negative electrode and electrolyte, general techniques relating to construction of lithium ion secondary battery, etc.) can be understood as design matters for a person skilled in the art which are based on the conventional techniques in the pertinent field.

1. Positive Electrode Composite Material for Lithium Ion Secondary Battery

FIG. 1 is a cross-sectional TEM image of a positive electrode composite material according to the present embodiment. As shown in FIG. 1, the positive electrode composite material according to the present embodiment includes a positive electrode active material 1 and a particulate region 2a and a film-shaped region 2b composed of a conductive oxide. Each of these will be specifically described below.

(1) Positive Electrode Active Material

The positive electrode active material 1 in the present embodiment is configured of a lithium composite oxide having a layered crystal structure including at least lithium. The positive electrode active material 1 in the present embodiment has a particulate shape, and FIG. 1 is a cross-sectional TEM image in which the vicinity of the surface of the particulate positive electrode active material is enlarged. The average particle diameter based on the cross-sectional TEM image of the particulate positive electrode active material 1 is about 1 μm to 20 μm (preferably 2 μm to 10 μm).

The lithium composite oxide constituting this positive electrode active material 1 can be exemplified by a lithium nickel composite oxide, a lithium nickel cobalt composite oxide, a lithium nickel cobalt manganese composite oxide and the like. Among these lithium composite oxides, a lithium composite oxide represented by the following general formula (3) is preferable. The lithium composite oxide represented by the following general formula (3) has high ion conductivity, so that the energy density of the constructed lithium ion secondary battery can be increased, and because such lithium composite oxide excels in thermal stability, the durability can also be improved.

$$Li_{1+\alpha}Ni_xCo_yMn_zMpO_{2-\gamma}A_\gamma \qquad (3)$$

where, M in the general formula (3) above is one or two or more elements selected from the group consisting of Zr, Mo. W. Mg, Ca, Na, Fe. Cr, Zn. Si, Sn. Al, and B; A in the formula (3) is one or two or more elements selected from the group consisting of F, Cl, and Br; and x, y, z, α, β, and γ is 0≤α≤0.7, 0≤x<0.9, 0≤y<0.4, x+y+z≈1, 0≤β≤0.1, 0≤γ≤0.5, respectively.

(2) Conductive Oxide (a) Composition of Conductive Oxide

As described above, the positive electrode composite material according to the present embodiment includes a conductive oxide. As the conductive oxide in the present invention, it is preferable to use, for example, a metal oxide represented by the following general formula (1).

$$MO_2 \quad (1)$$

In the general formula (1) above. M is one or two or more elements selected from transition metal elements of groups Va, VIa, VIIa, VIII, and Ib.

Specific examples of the metal oxide represented by $MO_2$ of the general formula (1) above include ruthenium dioxide ($RuO_2$), vanadium dioxide ($VO_2$), chromium dioxide ($CrO_2$), molybdenum dioxide ($MoO_2$), tungsten dioxide ($WO_2$), rhenium dioxide ($ReO_2$), niobium dioxide ($NbO_2$), rhodium dioxide ($RhO_2$), iridium dioxide ($IrO_2$), palladium dioxide ($PdO_2$), platinum dioxide ($PtO_2$), osmium dioxide ($OsO_2$) and the like.

Also, in addition to the metal oxide represented by the general formula (1) above, a metal composite oxide of a perovskite structure represented by the following general formula (2) may be used as the conductive oxide.

$$ABO_3 \quad (2)$$

In the general formula (2) above. A is one or two or more elements selected from the group consisting of divalent typical elements, lanthanoid elements, and a combination thereof.

Further, B in the general formula (2) is one or two or more elements selected from transition metal elements of groups IVa, Va, VIa, VIIa. VIII, and Ib.

As the metal composite oxide $ABO_3$ of the general formula (2), for example, a lanthanum manganese cobalt composite oxide (for example, $LaMn_{0.5}Co_{0.5}O_3$), lanthanum nickel composite oxide ($LaNiO_3$), strontium vanadate ($SrVO_3$), calcium vanadate ($CaVO_3$), strontium ferrate ($SrFeO_3$), lanthanum titanate ($LaTiO_3$), strontium chromate ($SrCrO_3$), calcium chromate ($CaCrO_3$), calcium ruthenate ($CaRuO_3$), strontium ruthenate ($SrRuO_3$), strontium iridate ($SrIrO_3$) or the like may be used.

Moreover, a metal composite oxide having a composition other than that shown by the general formula (1) and general formula (2) can also be used for the conductive oxide. Such a metal composite oxide can be exemplified by lanthanum strontium nickel composite oxide ($LaSrNiO_4$).

The metal oxide represented by the general formula (1) or the general formula (2) described above can appropriately form an electron path with the positive electrode active material, and appropriately reduce the resistance in the positive electrode. Among the specific examples described above, ruthenium dioxide and lanthanum manganese cobalt composite oxide can reduce the resistance in the positive electrode particularly appropriately.

(b) Structure of Conductive Oxide

As shown in FIG. 1, in the positive electrode composite material according to the present embodiment, a particulate region 2a where primary particles of the conductive oxide are aggregated and the film-shaped region 2b where the conductive oxide is formed in a film shape adhere to at least a part of the surface of the positive electrode active material 1.

As described above, the particulate region 2a is formed by the aggregation of primary particles of the conductive oxide, and the average particle diameter based on cross-sectional TEM observation of such primary particles is 0.3 nm or more, preferably 0.3 nm to 15 nm, and more preferably 1 nm to 10 nm. The particulate region 2a constituted by the primary particles of the conductive oxide having a relatively large particle diameter in this manner is in point contact with the surface of the positive electrode active material 1.

Therefore, an electron path can be formed at the contact point between the particulate region 2a and the positive electrode active material 1, and the surface of the positive electrode active material 1 is exposed at portions other than the contact point, thereby making it possible to ensure a wide contact area of the positive electrode active material 1 and the electrolyte.

The film-shaped region 2b is a portion appearing white in the cross-sectional TEM image shown in FIG. 1. The film-shaped region 2b is a region where the conductive oxide is formed in a film shape so as to cover the surface of the positive electrode active material 1. Although described hereinbelow in detail, the film-shaped region 2b in the present embodiment is constituted by a conductive oxide which has not been subjected to a crystallization process such as calcination, by contrast with the conductive oxides used in general lithium ion secondary batteries. Further, the film-shaped region 2b has a very dense structure in which, in cross-sectional TEM observation, no primary particles with a particle diameter equal to or greater than 0.3 nm are present, and no voids equal to or greater than 2 nm are present. Since the film-shaped region 2b is in surface contact with the surface of the positive electrode active material 1 and has a dense structure in which large primary particles and voids are not present, a wide electron path can be formed with the positive electrode active material 1.

Thus, in the positive electrode composite material according to the present embodiment, since the particulate region 2a and the film-shaped region 2b adhere as a mixture to a part of the surface of the positive electrode active material 1, a wide electron path can be formed at a location where the film-shaped region 2b has adhered, so that the resistance in the positive electrode can be significantly reduced, and the surface of the positive electrode active material 1 is appropriately exposed at a location where the particulate region 2a has adhered, so that sufficient contact area with the electrolyte can be ensured. Therefore, by forming the positive electrode of the lithium ion secondary battery by using the positive electrode composite material according to the present embodiment, it is possible to obtain a high-performance lithium ion secondary battery having battery performance that is significantly improved as compared with the related art.

Furthermore, when the positive electrode composite material according to the present embodiment is used, lithium ions are easily desorbed from the electrolyte, so that the speed of the electrode reaction at the positive electrode is increased over the conventional one to further improve the battery performance. This is understood to be because the electron density is different between the particulate region 2a and the film-shaped region 2b, and two types of conductive oxides different in the electron density are caused to adhere to the surface of the positive electrode active material, thereby making it possible to destabilize the structure of solvated lithium supplied from the electrolyte and reduce the activation energy in the desolvation process.

Further, the coverage based on cross-sectional TEM observation of the surface of the positive electrode active material 1 at the surface of the positive electrode active material 1 is preferably 0.9% to 51%, and more preferably 11% to 40%. By setting the coverage of the conductive oxide in this manner, sufficient contact area between the positive electrode active material and the electrolyte can be ensured, and a sufficient electron path can be formed, thereby making it possible to improve the battery performance appropriately.

In addition, as a result of conducting various experiments and studies on the positive electrode composite material according to the present embodiment, the inventors of the present invention have found that the battery performance is greatly influenced by the average particle diameter of the particulate region 2a and the film thickness of the film-shaped region 2b. Specifically, by setting the average particle diameter based on cross-sectional TEM observation of the particulate region 2a to 0.3 nm to 60 nm (preferably 0.6 nm to 55 nm), and setting the film thickness based on cross-sectional TEM observation of the film-shaped region 2b to 0.2 nm to 55 nm (preferably 0.5 nm to 50 nm), it is possible to construct a high-performance lithium ion secondary battery in which the normalized battery resistance is greatly reduced.

The area ratio of the film-shaped region 2b to the particulate region 2a in the cross-sectional TEM observation is preferably 0.2% to 50%. By using the positive electrode composite material in which the particulate region 2a and the film-shaped region 2b are present at such a ratio, the resistance in the positive electrode can be more suitably reduced to obtain high battery performance.

Further, it is preferable that 90% of primary particles among the plurality of primary particles constituting the particulate region 2a be present within 1.5 μm from the contact point between the particulate region 2a and the positive electrode active material 1. As a result, the electron path between the particulate region 2a and the positive electrode active material 1 can be formed more appropriately, thereby making it possible to reduce appropriately the resistance in the positive electrode.

Moreover, it is preferable that that the regions be formed so that at least parts of the particulate region 2a and the film-shaped region 2b be in contact with each other as shown in FIG. 1. By bringing the particulate region 2a and the film-shaped region 2b into contact with each other in such a manner, a sufficient electron path can be formed in the contact portion of these regions, and the contact area between the positive electrode active material and the electrolyte can be appropriately ensured. Therefore, the battery performance can be improved more suitably.

2. Method for Manufacturing Positive Electrode Composite Material for Lithium Ion Secondary Battery Next, a method for manufacturing the positive electrode composite material according to the above-described embodiment will be described.

(1) Production of Positive Electrode Active Material

The positive electrode active material can be produced through the same process as a positive electrode active material for a general lithium ion secondary battery. Specifically, an aqueous solution is prepared by weighing supply sources (raw materials) of metal elements other than Li so as to have a desired composition ratio and mixing the weighed supply sources with an aqueous solvent. As supply sources of the metal elements other than Li, for example, sulfates of additional metal elements such as Ni, Co, Mn and the like (nickel sulfate: $NiSO_4$, cobalt sulfate: $CoSO_4$, manganese sulfate: $MnSO_4$, and the like) may be used.

Next, the aqueous solution is neutralized by adding a basic aqueous solution (such as an aqueous sodium hydroxide solution) while stirring the prepared aqueous solution. As a result, the hydroxides of the above-mentioned additional metal elements precipitate, and a sol-like raw material hydroxide (precursor) can be obtained.

Then, a predetermined amount of lithium source (lithium carbonate, lithium hydroxide, lithium nitrate, and the like) is mixed with the obtained sol-like precursor, and then calcination is performed at 700° C. to 1000° C. (for example, 900° C.) for 1 h to 20 h (for example, 15 h) under an oxidizing atmosphere. By pulverizing the calcined body thus obtained to a desired particle diameter (for example, an average particle diameter of 10 μm), a particulate positive electrode active material composed of a lithium composite oxide having a layered crystal structure can be obtained.

(2) Adhesion of Conductive Oxide

In the manufacturing method according to the present embodiment, at least a part of the surface of the positive electrode active material obtained as described above, a particulate region where primary particles of the conductive oxide are aggregated, and a film-shaped region where the conductive oxide is formed in a film shaped are adhered to at least part of the surface of the positive electrode active material thus obtained.

Specifically, an alkoxide (for example, ruthenium alkoxide) of a main metal element of the conductive oxide (M in the general formula (1) above or A and B in the general formula (2)) is mixed and stirred with the positive electrode active material, and the mixture is dried at a predetermined temperature. After the alkoxide of the metal element is thus decomposed, the metal element is oxidized to form a conductive oxide, and the film-shaped conductive oxide adheres to the surface of the positive electrode active material. At this time, in the present embodiment, by contrast with the conventional technique, since crystallization treatment such as calcination is not performed after drying, a film-shaped region in which the conductive oxide is densely formed can be adhered to the surface of the positive electrode active material. The drying temperature in this step is preferably set to a temperature at which the conductive oxide does not crystallize, that is, 200° C. to 450° C. (for example, 400° C.).

In the present embodiment, next, the particulate region is caused to adhere to the positive electrode active material having the film-shaped region adhered to the surface. Specifically, mechanochemical treatment is performed after the powder of the positive electrode active material to which the film-shaped region has adhered and the powder of the conductive oxide are mixed. In the case of using a general mechanofusion apparatus (for example, NOBILTA MINI manufactured by Hosokawa Micron Corporation), it is preferable that the treatment temperature of the mechanochemical treatment be normal temperature (for example, 15° C. to 35° C.), the load power be 0.1 kW to 1.0 kW (for example, 0.5 kW), and the treatment time be set to 1 min to 10 min (for example, 3 min).

By so mixing the powder of the positive electrode active material to which the film-shaped region has adhered and the powder of the conductive oxide and performing mechanochemical treatment, mechanical energy is imparted to each particle. Therefore, the film-shaped region and the particulate region in which primary particles of the conductive oxide have aggregated can be adhered to at least a part of the surface of the positive electrode active material.

(3) Preparation of Positive Electrode Composite Material

The positive electrode composite material according to the present embodiment can be produced by dispersing the composite material of the positive electrode active material and the conductive oxide obtained as described above in a predetermined dispersion medium, and then appropriately adding other additives. As the dispersion medium and the other additives, those suitable for general lithium ion secondary batteries may be used without any particular limitation, and the present invention is not characterized thereby. Therefore, the description thereof is herein omitted.

3. Lithium Ion Secondary Battery

Next, a lithium ion secondary battery having a positive electrode produced using the positive electrode composite material according to the above-described embodiment will be specifically described. A lithium ion secondary battery provided with a wound electrode assembly is described below as an example, but such a configuration is not intended to limit the usage mode of the present invention. For example, the positive electrode active material of the present invention can also be used in a stacked electrode body in which a plurality of positive electrodes and negative electrodes is alternately stacked.

Figure 2:
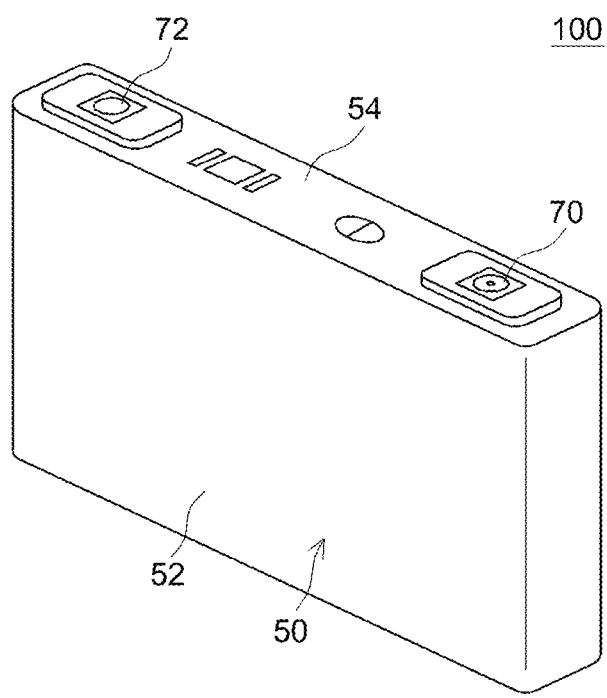
FIG. 2 is a perspective view schematically showing the outer shape of a lithium ion secondary battery.

FIG. 2 is a perspective view schematically showing the outer shape of a lithium ion secondary battery. A lithium ion secondary battery 100 is configured by housing an electrode body (not shown) inside an angular case 50 shown in FIG. 2.

(1) Case

A case 50 is composed of a flat case main body 52 having an open upper end and a lid 54 for closing the opening at the upper end. The lid 54 is provided with a positive electrode terminal 70 and a negative electrode terminal 72. Although not shown, the positive electrode terminal 70 is electrically connected to the positive electrode of the electrode body in the case 50, and the negative electrode terminal 72 is electrically connected to the negative electrode.

(2) Electrode Body

Figure 3:
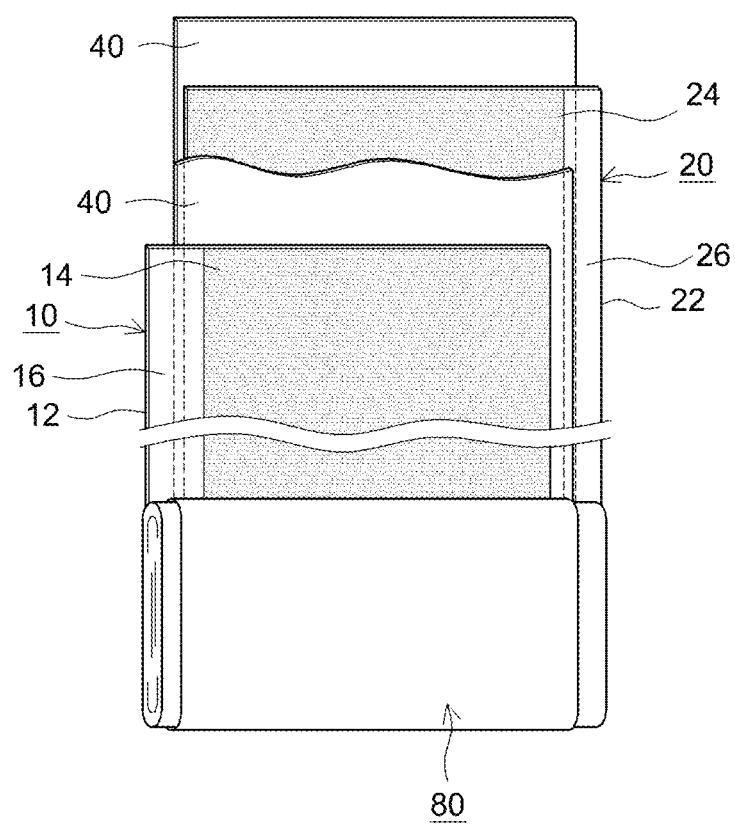
FIG. 3 is a perspective view schematically showing an electrode body of a lithium ion secondary battery.

Next, the electrode body housed inside the above-described case 50 is explained. FIG. 3 is a perspective view schematically showing an electrode body of a lithium ion secondary battery. The electrode body in the present embodiment is a wound electrode body 80 produced by laminating and winding long sheet-shaped positive electrode 10 and negative electrode 20 together with a long sheet-shaped separator 40 as shown in FIG. 3.

(a) Positive Electrode

In the positive electrode 10 in FIG. 3, a positive electrode composite material layer 14 including a positive electrode active material is applied to both surfaces of a long sheet-like positive electrode current collector 12. A positive electrode composite material layer non-formation portion 16 that is not coated with the positive electrode composite material layer 14 is formed at one side edge portion in the width direction of the positive electrode 10. This positive electrode composite material layer non-formation portion 16 is electrically connected to the positive electrode terminal 70 (see FIG. 2) described above.

The positive electrode composite material layer 14 in the present embodiment is formed of the positive electrode composite material having the above-described configuration. Specifically, after the positive electrode composite material according to the above-described embodiment is applied to both surfaces of the positive electrode current collector 12 and dried, the positive electrode composite material layer 14 is formed by pressing with a predetermined pressure.

In the positive electrode composite material layer 14, the particulate region 2a where the primary particles of the conductive oxide are aggregated and the film-shaped region 2b where the conductive oxide is formed in a film shape adhere to at least a part of the surface of the positive electrode active material 1 (see FIG. 1). By forming such a positive electrode composite material layer 14, the resistance of the positive electrode 10 can be reduced and the battery performance can be improved.

(b) Negative Electrode

In the negative electrode 20, similarly to the positive electrode 10, the negative electrode composite material layer 24 mainly composed of the negative electrode active material is applied to both surfaces of the long sheet-shaped negative electrode current collector 22. Then, a negative electrode composite material layer non-formation portion 26 is formed at one side edge portion in the width direction of the negative electrode 20, and this negative electrode composite material layer non-formation portion 26 is electrically connected to the negative electrode terminal 72 (see FIG. 1).

The material of the negative electrode active material in the present embodiment is not particularly limited, and any of various materials that may be used as a negative electrode active material of a general lithium ion secondary battery may be used singly or in combination (mixture or composite) of two or more thereof. Preferred examples of such negative electrode active materials include carbon materials such as graphite, non-graphitizable carbon (hard carbon), graphitizable carbon (soft carbon), carbon nanotubes, or materials structured of a combination of these. Among them, graphite-based materials (natural graphite (graphite), artificial graphite and the like) can be preferably used from the viewpoint of energy density.

Further, the negative electrode active material is not limited to the above-mentioned carbon-based material, and for example, lithium titanium composite oxides such as $Li_4Ti_5O_{12}$ and lithium composite oxides such as lithium transition metal composite nitrides may be used. In addition, various additives suitable for general lithium ion secondary batteries can be added, as required, to the negative electrode composite material layer 24 in the same manner as to the positive electrode composite material layer 14.

(c) Separator

The separator 40 is disposed so as to be interposed between the positive electrode 10 and the negative electrode 20 described above. A band-shaped sheet material having a predetermined width and having a plurality of minute holes is used as the separator 40. The material of the separator 40 can be the same as that used in a general lithium ion secondary battery, and for example, a porous polyolefin resin or the like may be used.

(4) Electrolyte

Further, the same electrolyte (for example, non-aqueous electrolytic solution) as that suitable for a general lithium ion secondary battery may be used without any particular limitation as the electrolyte housed in the case 50 together with the wound electrode body 80 described above. As a specific example, a nonaqueous electrolytic solution including $LiPF_6$ at a concentration of about 1 mol/L in a mixed solvent of ethylene carbonate (EC), dimethyl carbonate (DMC) and ethyl methyl carbonate (EMC) (for example, volume ratios 3:4:3) may be used.

4. Construction of Lithium Ion Secondary Battery

In constructing a lithium ion secondary battery provided with the above-described members, first, the wound electrode body 80 is housed in the case main body 52, and the electrolyte is filled (poured) in the case main body 52. Thereafter, the electrode terminals 70 and 72 provided at the lid 54 are connected to the positive electrode composite material layer non-formation portion 16 and the negative electrode composite material layer non-formation portion 26 of the wound electrode body 80, and then the opening at the upper end of the case main body 52 is sealed with the lid 54. A lithium ion secondary battery 100 is thus constructed.

In the lithium ion secondary battery 100 constructed in this manner, since the electron path is sufficiently formed by the conductive oxide in the positive electrode composite material layer 14 of the positive electrode 10, the resistance in the positive electrode 10 is significantly reduced. Since the sufficient contact area between the positive electrode active material and the electrolyte can be ensured, the increase in reaction resistance caused by coating the positive electrode active material with the conductive oxide can be appropriately suppressed. Furthermore, with such a lithium ion secondary battery 100, it is possible to facilitate the desorption of lithium ions from the electrolyte and to make the speed of the electrode reaction in the positive electrode higher than that in the related art. As described above, according to the present embodiment, it is possible to provide a lithium ion secondary battery in which various types of battery performance are improved as compared with the related art.

TEST EXAMPLES

Hereinafter, test examples relating to the present invention are described, but the description of the test examples is not intended to restrict the present invention.

In the test examples, the following tests A to C were conducted to investigate the types of effects produced on battery performance when a lithium ion secondary battery is constructed using a positive electrode composite material in which a particulate region and a film-shaped region composed of a conductive oxide are adhered to a part of the surface of a positive electrode active material.

1. Test A (1) Test Examples 1 to 5

Positive electrodes were produced using different positive electrode composite materials in each of Test Examples 1 to 5, and lithium ion secondary batteries for evaluation tests were constructed using the positive electrodes.

Specifically, as shown in Table 1, in Test Example 1, ruthenium dioxide ($RuO_2$) was used as the conductive oxide, and the positive electrode composite material in which the particulate region and the film-shaped region composed of the $RuO_2$ adhered to the surface of the positive electrode active material was used. A method for causing the particulate region and the film-shaped region to adhere to the surface of the positive electrode active material was performed according to the "Adhesion of Conductive Oxide" section described hereinabove. At this time, the amount (mol) of the conductive oxide used in the film-shaped region and the amount of the conductive oxide used in the particulate region are equal to each other, and the amount of the conductive oxide used was adjusted such that the total weight of the Ru element contained in the film-shaped region and the particulate region was 0.5 wt %.

Further, in Test Example 2, a positive electrode composite material was used in which only the film-shaped region composed of $RuO_2$ adhered to the surface of the positive electrode active material. In Test Example 3, a positive electrode composite material was used in which only the particulate region composed of $RuO_2$ adhered to the surface of the positive electrode active material. In Test Example 4, as a comparison object, a positive electrode composite material was used to which a conductive oxide was not added. Other conditions of Test Examples 2 to 4 were set to the same conditions as in Test Example 1.

Furthermore, in Test Example 5, a positive electrode composite material was used in which a lanthanum manganese cobalt composite oxide ($LaMn_{0.5}Co_{0.5}O_3$) was used as the conductive oxide, and the particulate region and the film-shaped region composed of the $LaMn_{0.5}Co_{0.5}O_3$ adhered to the surface of the positive electrode active material. Other conditions of Test Example 5 were set to the same conditions as in Test Example 1.

In Test Examples 1 to 5, lithium nickel cobalt manganese composite oxide ($LiNi_{0.33}Co_{0.33}Mn_{0.33}O_2$) was used as a positive electrode active material. In addition, in each of Test Examples 1 to 3 and Test Example 5, the coverage of the conductive oxide was set to 11%.

(2) Construction of Lithium Ion Secondary Battery for Evaluation Tests

The procedure of constructing a lithium ion secondary battery for evaluation tests will be specifically described hereinbelow.

(a) Production of Positive Electrode

Positive electrodes were manufactured, as described above, by using positive electrode composite materials that differed in Test Examples 1 to 5. Specifically, a composite material of a positive electrode active material and a conductive oxide was prepared in each of Test Examples 1 to 5, and the composite material was dispersed in a dispersion medium (NMP: N-methylpyrrolidone), and then a binder (PVDF) and a conductive aid (acetylene black) were added to prepare a paste-like positive electrode composite material. At this time, each material was weighed so as to obtain a solid content of 56 wt %, and mixing was performed using a planetary mixer. The mass ratios of the positive electrode active material, conductive aid, binder, and dispersant contained in the positive electrode composite material were set to 80:8:2:0.2.

Next, the positive electrode composite material was applied to both surfaces of a sheet-shaped positive electrode current collector (aluminum foil) by using a die coater and dried, and then pressed at a predetermined pressure to produce a sheet-shaped positive electrode in which the positive electrode composite material was applied to the positive electrode current collector.

(b) Production of Negative Electrode

A negative electrode was produced using a natural graphite material (graphite) having an average particle diameter of 20 μm as a negative electrode active material in each of Test Examples 1 to 5. Specifically, a negative electrode active material, a binder (SBR: styrene-butadiene copolymer), and a thickener (CMC) were mixed in a dispersion solvent (water) to prepare a paste-like negative electrode composite material. This negative electrode composite material was applied to both surfaces of a sheet-shaped negative electrode collector (copper foil), and dried, and then pressed to produce a sheet-shaped negative electrode. The mixing ratios of the negative electrode active material, SBR, and CMC in the above-described negative electrode composite material were adjusted to 98:1:1.

(c) Production of Battery

Next, the positive electrode and the negative electrode described above were laminated with a sheet-shaped separator interposed therebetween, and the laminate was thereafter wound to produce a flat wound electrode body. A lithium ion secondary battery for evaluation tests was constructed by connecting the produced wound electrode body to the external terminals of a case, housing together with the electrolyte in the case and sealing. As the electrolyte, a non-aqueous electrolytic solution was used in which $LiPF_6$ as a supporting salt was contained at a concentration of about 1 mol/liter in a mixed solvent including EC, DMC, and EMC at volume ratios of 1:1:1.

(3) Evaluation Test

In the present test example, a battery resistance evaluation test was performed on lithium ion secondary batteries for evaluation tests of Test Examples 1 to 5. In addition, in the present test example, the activation process of the lithium ion secondary battery as an evaluation object was performed before the below-described evaluation test. Specifically, after charging up to 4.2 V by constant-current charging in which the current value was set to ⅓ C, constant-voltage charging was performed until the current value became 1/50 C, and a fully charged state was achieved. Then, constant-current discharging in which the current value was set to ⅓ C was performed to 3 V, and the capacitance at this time was taken as the initial capacitance. The temperature in this activation treatment was set to 25° C.

In this test example, the "normalized resistance value" was measured to evaluate the battery resistance of each test example. Specifically, first, the open circuit voltage for each evaluation test was adjusted to 3.70 V corresponding to 56% of SOC (State of Charge). Then, each battery was placed under a temperature condition of 25° C., and constant-current discharging was performed until the voltage between the terminals became 3.00 V. The voltage between the terminals and the electric current value in 5 sec after the start of discharging were measured, and the resistance value calculated based on the measurement result was taken as the "normalized resistance value". The calculation results are shown in Table 1. The "normalized resistance value" in Table 1 is shown by the logarithm for which the measurement result of Test Example 4 was taken as 100.

TABLE 1

| Test example | Active material | Conductive oxide | Structure of conductive oxide | | Coverage (%) | Normalized resistance value |
|---|---|---|---|---|---|---|
| | | | Particulate region | Film-shaped region | | |
| 1 | $LiNi_{1/3}Co_{1/3}Mn_{1/3}O_2$ | $RuO_2$ | Present | Present | 11 | 75 |
| 2 | $LiNi_{1/3}Co_{1/3}Mn_{1/3}O_2$ | $RuO_2$ | Absent | Present | 11 | 92 |
| 3 | $LiNi_{1/3}Co_{1/3}Mn_{1/3}O_2$ | $RuO_2$ | Present | Absent | 11 | 90 |
| 4 | $LiNi_{1/3}Co_{1/3}Mn_{1/3}O_2$ | — | Absent | Absent | — | 100 |
| 5 | $LiNi_{1/3}Co_{1/3}Mn_{1/3}O_2$ | $LaMn_{0.5}Co_{0.5}O_3$ | Present | Present | 11 | 77 |

(4) Test Results

From the above test results, it follows that in Test Example 1, the normalized resistance value was significantly lower than in Test Examples 2 to 4. This result confirmed that by adhering both the particulate region and the film-shaped region made of $RuO_2$, which is a conductive oxide represented by the general formula: $MO_2$, to the surface of the positive electrode active material, an appropriate electron path is formed between the positive electrode active material and the conductive oxide and sufficient contact area between the positive electrode active material and the electrolyte is ensured, thereby making it is possible to construct a high-performance lithium ion secondary battery.

Further, the result that the normalized resistance value was reduced to the same degree as in Test Example 1 was also obtained in Test Example 5. This result has confirmed that a high-performance lithium ion secondary battery can also be obtained by using a conductive oxide represented by the general formula $ABO_3$, such as $LaMn_{0.5}Co_{0.5}O_3$, instead of the conductive oxide represented by the general formula $MO_2$, such as $RuO_2$, and causing, both the particulate region and the film-shaped region composed of the conductive oxide of such a composition to adhere to the surface of the positive electrode active material.

2. Test B

A test B was conducted to investigate the effect produced on battery performance by the coverage of the conductive oxide on the surface of the positive electrode active material when both the particulate region and the film-shaped region composed of the conductive oxide are caused to adhere to the surface of the positive electrode active material.

In Test B, as shown in Table 2 below, the normalized resistance value was measured for lithium ion secondary batteries (Test Examples 6 to 9) constructed under the same conditions as in Test Example 1 of Test A, except that the coverage of the conductive oxide was varied. In Table 2 below, the results of Test Examples 1 and 4 in Test A are also described as comparative controls.

TABLE 2

| Test example | Active material | Composition of conductive oxide | Structure of conductive oxide | | Coverage (%) | Normalized resistance value |
|---|---|---|---|---|---|---|
| | | | Particulate region | Film-shaped region | | |
| 1 | $LiNi_{1/3}Co_{1/3}Mn_{1/3}O_2$ | $RuO_2$ | Present | Present | 11 | 75 |
| 4 | $LiNi_{1/3}Co_{1/3}Mn_{1/3}O_2$ | — | Absent | Absent | — | 100 |
| 6 | $LiNi_{1/3}Co_{1/3}Mn_{1/3}O_2$ | $RuO_2$ | Present | Present | 32 | 71 |
| 7 | $LiNi_{1/3}Co_{1/3}Mn_{1/3}O_2$ | $RuO_2$ | Present | Present | 40 | 73 |
| 8 | $LiNi_{1/3}Co_{1/3}Mn_{1/3}O_2$ | $RuO_2$ | Present | Present | 0.9 | 83 |
| 9 | $LiNi_{1/3}Co_{1/3}Mn_{1/3}O_2$ | $RuO_2$ | Present | Present | 51 | 81 |

As shown in Table 2, in Test Examples 1 and 6 to 9, a decrease in the normalized resistance value was confirmed, and among these, the normalized resistance value in Test Examples 1, 4 and 7 has decreased more significantly. This result has confirmed that when both the particulate region and the film-shaped region composed of the conductive oxide are caused to adhere to the surface of the positive electrode active material, the coverage of the conductive oxide is preferably 0.9% to 51%, and more preferable 11% to 40%.

3. Test C

Next, Test C was conducted to investigate the effect produced on battery performance by the average particle diameter of the particulate region of the conductive oxide and the film thickness of the film-shaped region when both the particulate region and the film-shaped region composed of the conductive oxide are caused to adhere to the surface of the positive electrode active material.

In Test C, as shown in Table 3 below, the normalized resistance value was measured for lithium ion secondary batteries (Test Examples 10 to 16) constructed under the same conditions as in Test Example 6 of Test B, except that the average particle diameter of the particulate region and the film thickness of the film-shaped region were varied.

TABLE 3

| Test example | Structure of conductive oxide | | Average particle diameter of particulate region (nm) | Film thickness of film-shaped region (nm) | Coverage (%) | Normalized resistance value |
|---|---|---|---|---|---|---|
| | Particulate region | Film-shaped region | | | | |
| 10 | Present | Present | 0.6 | 0.5 | 32 | 74 |
| 11 | Present | Present | 23 | 25 | 32 | 71 |
| 12 | Present | Present | 55 | 50 | 32 | 72 |
| 13 | Present | Present | 23 | 0.2 | 32 | 83 |
| 14 | Present | Present | 23 | 55 | 32 | 82 |
| 15 | Present | Present | 0.3 | 25 | 32 | 80 |
| 16 | Present | Present | 60 | 25 | 32 | 80 |

As shown in Table 3, a decrease in the normalized resistance value was confirmed in any of Test Examples 10 to 16, but a more significant decrease in the normalized resistance value was confirmed in Test Examples 10 to 12. This result has confirmed that a lithium ion secondary battery having better battery performance can be constructed by setting the average particle diameter of the particulate region in the range of 0.6 nm to 55 nm and setting the film thickness of the film-shaped region in the range of 0.5 nm to 50 nm.

The present invention has been described hereinabove in detail, but the above-described embodiments are merely exemplary, and the invention disclosed herein includes various modifications and alterations of the specific examples described above.

Further, since the lithium ion secondary battery provided by the technique disclosed herein exhibits, as described above, excellent battery performance, the battery can be advantageously used, for example, as a power source for a motor (electric motor) mounted on a vehicle such as an automobile. Moreover, such lithium ion secondary batteries may be used in the form of a battery pack formed by connecting a plurality thereof in series and/or in parallel. Therefore, according to the technique disclosed herein, it is possible to provide a vehicle (typically, an automobile, in particular an automobile provided with an electric motor, such as a hybrid automobile, an electric automobile, and a fuel cell automobile) equipped with a lithium ion secondary battery, or a battery pack including a plurality of such batteries, as a power source.

REFERENCE SIGNS LIST

1 Positive electrode active material
2a Particulate area
2b Film-shaped region
10 Positive electrode
12 Positive electrode current collector
14 Positive electrode composite material layer
16 Positive electrode composite material layer non-formation portion
20 Negative electrode
22 Negative electrode current collector
24 Negative electrode composite material layer
26 Negative electrode composite material layer non-formation portion
40 Separator
50 Case
52 Case body
54 Lid
70 Positive electrode terminal
72 Negative electrode terminal
80 Wound electrode body
100 Lithium ion secondary battery

The invention claimed is:

1. A positive electrode composite material for a lithium ion secondary battery, the positive electrode composite material comprising:
a particulate positive electrode active material composed of a lithium composite oxide having a layered crystal structure including at least lithium, and a conductive oxide, wherein
a particulate region where primary particles of the conductive oxide are aggregated, and a film-shaped region where the conductive oxide is formed in a film shape adhere to at least a part of the surface of the positive electrode active material,
an average particle diameter of primary particles in the particulate region based on cross-sectional TEM observation is equal to or greater than 0.3 nm, and
in cross-sectional TEM observation of the film-shaped region, no particles with a particle diameter equal to or greater than 0.3 nm are observed, and there are no voids equal to or greater than 2 nm.

2. The positive electrode composite material for a lithium ion secondary battery according to claim 1, wherein the conductive oxide is a metal oxide represented by a general formula (1):

$$MO_2 \qquad (1)$$

(where, M in the formula (1) above is one or two or more elements selected from transition metal elements of groups Va, VIa, VIIa, VIII, and Ib), or a metal oxide having a perovskite structure and represented by a general formula (2):

$$ABO_3 \quad (2)$$

(where, A in the formula (2) above is one or two or more elements selected from the group consisting of divalent typical elements, lanthanoid elements, and a combination thereof, and B is one or two or more elements selected from transition metal elements of groups IVa, Va, VIa, VIIa, VIII, and Ib).

3. The positive electrode composite material for a lithium ion secondary battery according to claim 2, wherein the conductive oxide is ruthenium oxide or a lanthanum manganese cobalt composite oxide.

4. The positive electrode composite material for a lithium ion secondary battery according to claim 1, wherein
the positive electrode active material is a lithium composite oxide represented by a general formula (3):

$$Li_{1+\alpha}Ni_xCo_yMn_zM_\beta O_{2-\gamma}A_\gamma \quad (3)$$

(where, M in the formula (3) above is one or two or more elements selected from the group consisting of Zr, Mo, W, Mg, Ca, Na, Fe, Cr, Zn, Si, Sn, Al, and B; A in the formula (3) is one or two or more elements selected from the group consisting of F, Cl, and Br; and x, y, z, $\alpha$, $\beta$, and $\gamma$ is $0 \leq \alpha \leq 0.7$, $0 \leq x < 0.9$, $0 \leq y < 0.4$, $0 \leq \beta \leq 0.1$ n $0.1 \leq \gamma \leq 0.5$, respectively).

5. The positive electrode composite material for a lithium ion secondary battery according to claim 1, wherein
a coverage based on cross-sectional TEM observation of the conductive oxide on the surface of the positive electrode active material is 11% to 40%.

6. The positive electrode composite material for a lithium ion secondary battery according to claim 1, wherein
an average particle diameter based on cross-sectional TEM observation of the particulate region is 0.6 nm to 55 nm, and
a film thickness based on cross-sectional TEM observation of the film-shaped region is 0.5 nm to 50 nm.

7. The positive electrode composite material for a lithium ion secondary battery according to claim 1, wherein at least parts of the particulate region and the film-shaped region are in contact with each other.

8. A lithium ion secondary battery comprising: a positive electrode having a positive electrode composite material layer applied to a positive electrode current collector; a negative electrode having a negative electrode composite material layer applied to a negative electrode current collector; and a non-aqueous electrolyte, wherein
the positive electrode composite material layer includes a particulate positive electrode active material composed of a lithium composite oxide having a layered crystal structure including at least lithium, and a conductive oxide,
a particulate region where primary particles of the conductive oxide are aggregated, and a film-shaped region where the conductive oxide is formed in a film shape adhere to at least a part of the surface of the positive electrode active material,
an average particle diameter based on cross-sectional TEM observation of primary particles in the particulate region is equal to or greater than 0.3 nm, and
in cross-sectional TEM observation of the film-shaped region, no particles with a particle diameter equal to or greater than 0.3 nm are observed, and there are no voids equal to or greater than 2 nm.

* * * * *